United States Patent [19]

Hart

[11] Patent Number: 5,588,215

[45] Date of Patent: Dec. 31, 1996

[54] TRANSPORTABLE MEASUREMENT DEVICE FOR CHILDREN'S CLOTHES

[76] Inventor: Penny F. Hart, 500 E. 83rd St., Apt. 2G, New York, N.Y. 10028

[21] Appl. No.: 248,702

[22] Filed: May 25, 1994

[51] Int. Cl.[6] ........................................ G01B 3/10
[52] U.S. Cl. ........................ 33/2 R; 33/494; 33/759
[58] Field of Search .................. 33/2 R, 2 A, 3 A, 33/759, 760, 767, 512, 679.1, 494

[56] References Cited

U.S. PATENT DOCUMENTS

| | | | |
|---|---|---|---|
| 709,665 | 9/1902 | Cort | 33/2 R |
| 1,079,333 | 11/1913 | Goldberger | 33/2 R |
| 1,372,732 | 3/1921 | Woodrich | 33/2 R |
| 1,457,964 | 6/1923 | Doty | 33/512 |
| 1,974,085 | 9/1934 | Shields et al. | 33/512 |
| 1,983,966 | 12/1934 | Boyd | 33/512 |
| 3,020,643 | 2/1962 | Moran | 33/512 |
| 3,292,261 | 12/1966 | Hayes | 33/2 R |
| 4,502,226 | 3/1985 | Hung | 33/767 |

FOREIGN PATENT DOCUMENTS

| 2552872 | 4/1985 | France | 33/767 |
|---|---|---|---|

*Primary Examiner*—Thomas B. Will
*Attorney, Agent, or Firm*—Mitchell A. Stein; Stein & Associates, P.C.

[57] ABSTRACT

An apparatus for measuring apparel, having an elongated member with a surface, a first reference point on the surface and a second marking on said surface such that the distance between said first reference point and the second marking is equal to the distance from the neck to the crotch of an average person at a particular age and a third marking on the surface such that the distance between the first reference point and the third marking is equal to the distance from the neck to the crotch of an average person at a second particular age.

5 Claims, 3 Drawing Sheets

TRANSPORTABLE MEASUREMENT DEVICE FOR CHILDREN'S CLOTHES

FIELD OF THE INVENTION

The present invention relates to the field of measuring devices, and more particularly, the field of transportable measuring devices for sizing children's clothes to determine the proper size of clothes that a particular child can wear through various stages of his/her development.

BACKGROUND OF THE INVENTION

In the field of measuring devices, it is often difficult to determine the proper size of clothes for a proper fit just by knowing the age of the child. It is even more difficult to determine the proper clothing size that the child will be wearing at a specified future time. One reason for this difficulty is that manufacturers have no specific industry standard that specifies the particular dimensions of children's clothes coordinated with the proper labeling. For example, an outfit sized at "6 months" by a manufacturer typically varies greatly in actual size from one manufacturer to another. Moreover, a 6 month old child may more properly fit into an outfit that is sized by a manufacturer as "3 to 6 month", "6 month" or even "6 to 9 month", depending on how the manufacturer chooses to size the garments. Irrespective of actual fit, some manufacturers run their sizes smaller than others, relative to actual growth size of a child.

One way to determine the size of a child is to take a standard tape measure with inches and fractions of inches on it, and actually measure the child. With this information, one can go to the clothing store and measure the clothes in order to determine which size clothes the child will best fit into. The disadvantages and problems to this method are numerous. First, the shopper has to either re-measure the child every time before shopping or remember what length the child was the last time he or she was measured. Another problem is that there must be a child available to be measured. This is not possible when, for example, the shopper is buying for someone else's child and has no knowledge of the child's actual size, age, or dimensions.

Another disadvantage with this simplified method is that this gives the potential clothing purchaser no indication of what size the child will need in the future. For example, if someone is shopping for winter clothes in September, they will want the clothes to fit in January. Typically the stores put out all their fall fashions three to four months in advance. For a small child, the difference of three months, in this example from September to January, can mean a substantial growth in size of the child.

Standard tape measures are generally known in the art and come in a variety of sizes and shapes. They are often found placed in a hardened case that encloses a retractable, coiled blade, loosely maintained (like a cloth measure), or foldably configured. The typical blade possesses standard units of measure of inches and meters, and subunits thereof (either in English or metric units) on one or both sides of the blade. The blade can be made from any number of flexible materials including fabric, fiberglass or thin metal. If the blade is encased, the retracting mechanism of the tape measure is also known in the art. It is normally either some type of spring mechanism attached to the inside end of the blade to automatically retract the blade, or a small handle on the outside of the case for the user to rewind the blade manually back into the case. In order stop the blade from always retracting with the automatic retraction type mechanism, a two position switch is typically placed somewhere on the outside of the case for the user to operate in order for the user to lock the blade while pulled out. This will stop the spring from pulling the blade back into the case until the operator disengages the lock and allows the spring to retract the blade.

SUMMARY OF THE INVENTION

The various features of novelty which characterize the invention are pointed out with particularity in the claims annexed hereto and forming a part of the disclosure. For a better understanding of the invention, its operating advantages, and specific objects attained by its use, reference should be had to the drawing and descriptive matter in which there are illustrated and described preferred embodiments of the invention.

The present invention relates to a transportable measuring device that can be carried in a pocket or purse to a clothing store. In particular, the invention includes a small sizing device that is preferably in the form of a standard tape measure. The typical tape measure is enclosed in a hard shell case, but need not have the casing. Instead, the tape measure can be made of cloth or any suitably strong material that can be folded or coiled up into a small area. The preferred tape measure consists of a reasonably hard case, e.g. metal or ABS resin, that holds a retractable, coiled blade. The blade can be of any material that can be folded or bent, for example, thin steel, fabric or fiberglass.

On the blade are tick or hash marks representing units of measure. In the present invention, the units on the blade are units of months and represent the child's various sizes and the child's future growth. This is typically done in three month intervals for the first year of the child. For the second year, the units are in six month intervals. The scale of the measurement is the distance from the neck to the crotch of an average child at each age. The sizing device is held up against the article of clothing in question and the measurement shows the true size of the garment.

BRIEF DESCRIPTION OF THE DRAWINGS

The present invention is further described in detail below with reference to the accompanying drawing, in which.

DETAILED DESCRIPTION OF THE PREFERRED EMBODIMENTS

Figure 1:
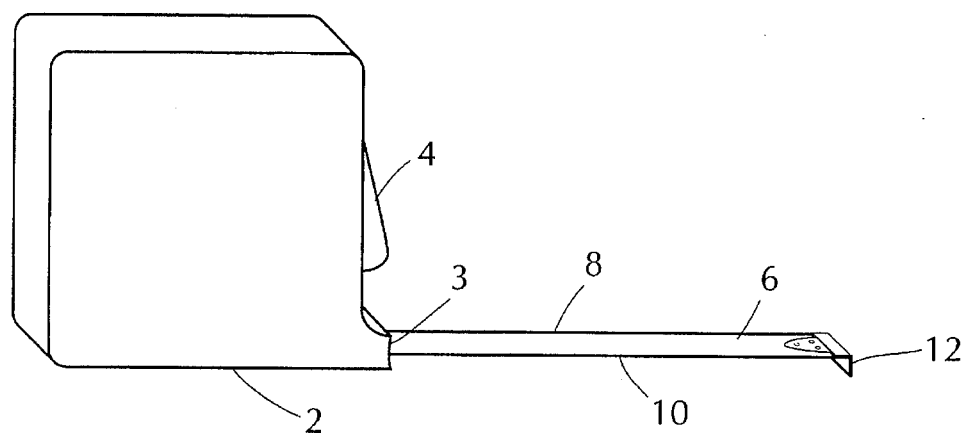
FIG. 1 is a typical embodiment or the invention using a squared-off tape measure with an automatically retractable metal blade.

In FIG. 1, a first embodiment of the present invention is shown, wherein case 2, comprising, by way of example, hardened plastic or ABS resin, contains retractable blade 6 coiled therewithin and fed through slot 3 such that a portion of blade 6 protrudes outwardly from case 2. Blade 6 is typically comprised of a thin steel, but can be any material, e.g. fabric or fiberglass, such that blade 6 can be extended outwardly from case 2, and recoiled within case 2. In this embodiment, blade 6 is coiled about a spring (not shown) that is housed within case 2, for which a locking mechanism is provided that is releasable by pressing lever 4. Such engagement and disengagement means including the spring and locking mechanism are well known in the art. When the locking mechanism after blade 6 is extended outwardly from case 2, retraction of blade 6 is enabled by pressing lever 4 which automatically retracts blade 6 back into its coiled position in case 2. Alternatively, lever 4 may comprise a two position switch that will lock blade 6 in place when outwardly extended from case 2, and thereby prevent blade 6 from retracting back into case 2, until use of blade 6 is completed. In this instance, in the locked position, lever 4 will engage blade 6 by pressing blade 6 against an inside wall of case 2 and thereby impeding the springing action from retracting blade 6 back into case 2. To reach the unlocked position, lever 4 is again engaged, thereby releasing the spring to retract blade 6 back into case 2.

As further shown in FIG. 1, blade 6 comprises upper surface 8 and lower surface 10, as well as generic grasping leader 12 which provides the user with an area of fabric or metal to enable the grasping, pulling and affixing action required to extract tape 6 and use tape 6 to measure clothing, as more fully described hereinbelow. It should be appreciated that the information displayed on either the upper surface 8 or lower surface 10 is unique to the invention, and provides for a determination of proper clothing to procure based upon the age of the child as translated through the hash markings or indicators affixed thereon, and described in greater detail hereinbelow.

Figure 2:
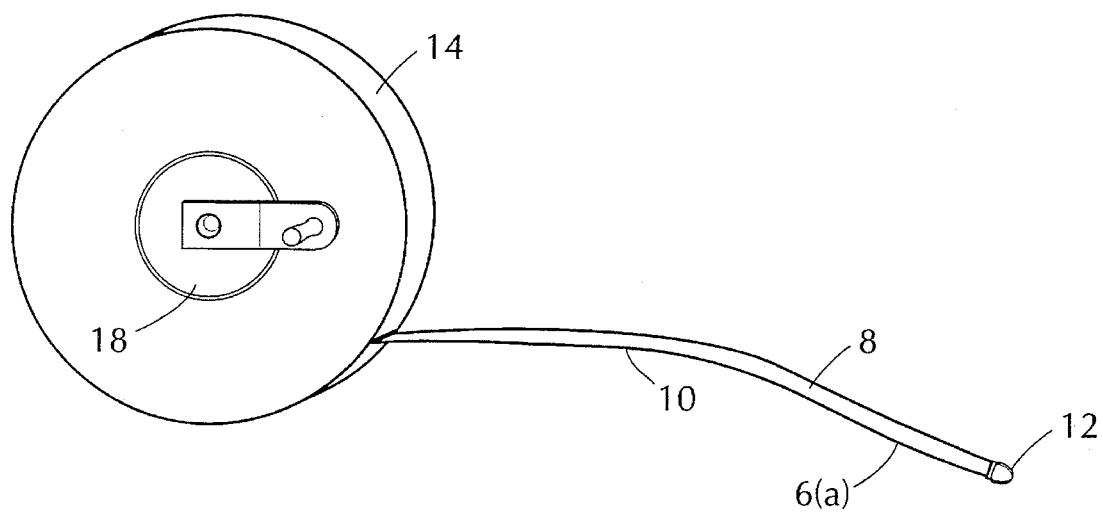
FIG. 2 is a typical embodiment of the invention using a round tape measure with a manually retractable, cloth blade.

In FIG. 2, an alternative embodiment of the instant invention is shown, wherein case 14 possesses a rounded shape with a manual retraction mechanism comprising a spool 18 about which tape 6(*a*) is wound, such that leader 12 when pulled provides for extraction of tape 6(*a*) from case 14. In turn, handle 16 rotates spool 18 in a manner that provides for manual retraction of tape 6(*a*). Handle 16 can also be foldably mounted such that upon completion of use, or extraction of tape 6(*a*) handle 16 is nestled into a locked position in case 14.

In the embodiments shown in FIG. 1 and FIG. 2, It is desired to have a device that is small, slim and light-weight in order to fit comfortably into a pocket or purse. Alternatively, the device can be manufactured from more durable materials, and in larger sizes for use in wholesale or retail environments. Likewise the dimensions of case, tape/blade and insertion and extraction can be of any nature known to those of reasonable skill in the an without departing from the spirit or intent of the invention.

Figure 3:
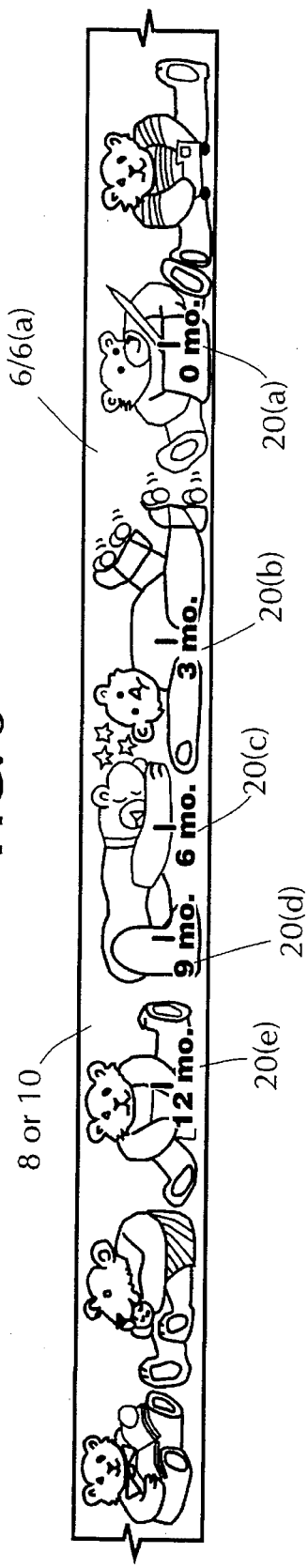
FIG. 3 is a detail drawing of a blade showing hash marks in month increments that approximate the length of clothing (from neck to crotch) that will fit a child of an age shown the number affixed proximate to the hash mark.

Standard measurement markings may be included on one side 8 or 10 of either blade 6 or tape 6(*a*) in English or metric units with hash marks that comprise fractions of inches or centimeters. However, on the other side 10 or 8 of blade 6 or tape 6(*a*) are other unique demarcations, examples of which are shown in FIG. 3. Such demarcations 20 represent various ages of a child, where the distance between demarcations and the beginning of the tape can be sized against clothing to determine whether the clothing is appropriately sized for the child of the age so indicated by demarcations 20. It should be appreciated that the demarcation 20(*a*) is about twelve inches from the neck to the crotch for girls, and about thirteen inches from the neck to the crotch for boys, as more further shown in FIGS. 5(*a*) and 5(*b*). Thus, hash marks or demarcations 20 range from, in the example shown in FIG. 3, "0 mo" (20(*a*)), where "mo" is short for months, to "3 mo" (20(*b*)), "6 mo" (20(*c*)), "9 mo" (20(*d*)), "12 mo" (20(*e*)). It should be recognized that such an extendible blade 6 or tape 6(*a*) should include demarcations 20 that range up to and including 24 months of age. This is a consequence of the fact that after 24 months of age, a child's growth pattern will begin to vary so widely that there no longer is a viable average size that can be used as a reliable standard. Accordingly, the distance from beginning of the tape to any of hash marks or demarcations 20 represent the average distance from the neck to the crotch of clothing (plus twelve inches for girls and thirteen inches for boys as more fully shown in FIGS. 5(*a*) and 5(*b*)) that would be appropriate for the specific age shown by demarcations 20.

It should now be appreciated that in order to use the device, the user, at a clothing store, holds blade 6 or tape 6(*a*) against an article of clothing that is sought to be purchased. The beginning of the tape is placed against either the neck or the crotch of the garment, and the purchaser, knowing the age of the child for whom the garment is sought, evaluates whether the garment will fit by determining whether the proper demarcation representing the child's age aligns properly with the alternate end of the garment (i.e., the crotch or the neck). Thus, the sizing device shown herein will reveal the proper age of a child that the garment will correctly fit. By way of example, if the article of clothing measures "6 mo." on the device shown herein, i.e., aligns from the beginning of the tape when placed at the neck of the garment, to "6 mo." at demarcation 20(*c*) when extended to the crotch of the garment, then the purchaser can safely purchase the garment for wearing by a child of 6 months of age. It should be under stood that the tape begins with a hash mark that is placed against the neck of the garment and is extended therefrom. The point "0 month" is under stood to be about twelve inches from the beginning hash mark of the tape for girls and about thirteen inches from the beginning hash mark of the tape for boys, as more clearly shown in FIGS. 5(*a*) and 5(*b*).

Figure 4B:
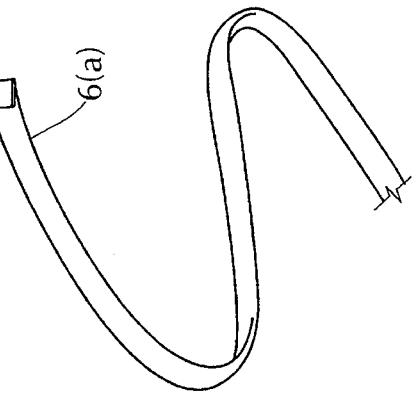
FIG. 4a and 4b are embodiments of the invention without a case showing hash marks of various ages for sizing.
Figure 4A:
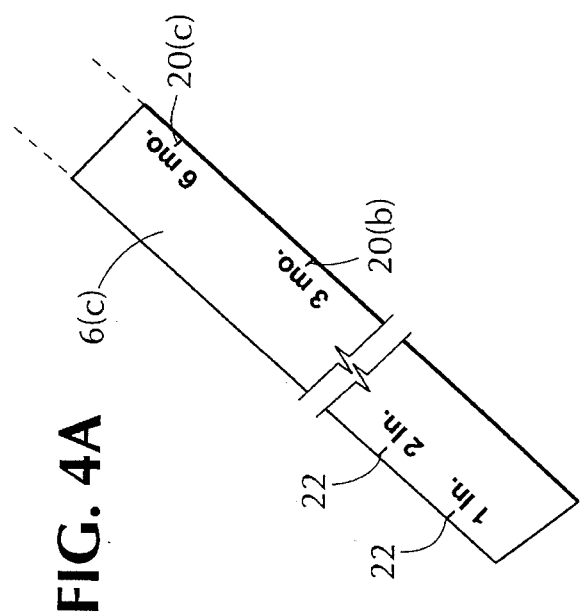

An alternative embodiment is shown in FIG. 4(*a*) wherein ruler 6(*c*) is comprised of a rigid material and possesses both demarcations 20 (in this instance showing 6 months at 20(*c*) and 3 months at 20(*b*)) as well as actual inch markings 22. Should it be desired, blade 6(*c*) can possesses a pivot point for folding in order for a fit in a pocket or purse.

Another alternative embodiment is shown in FIG. 4(*b*), wherein flexible tape 6(*b*) is shown without case 14. In this embodiment, tape 6(*b*) can be manually spooled for easy carrying.

Figure 5A:
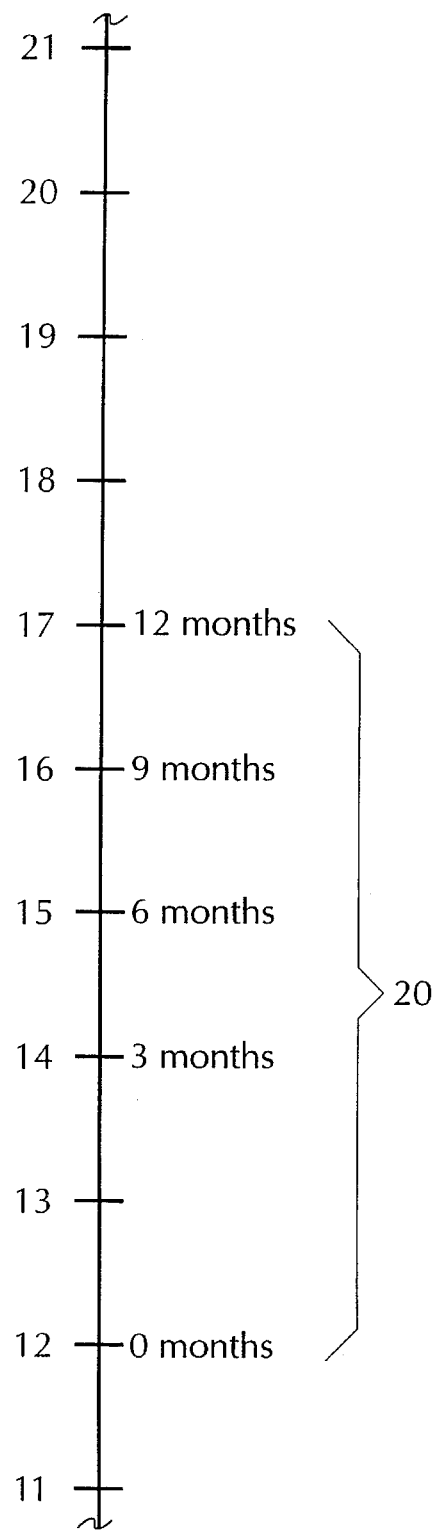
FIGS. 5(a) and 5(b) represent approximate age-based demarcation and corresponding inch-based distances from neck to crotch in garments for each of girls and boys respectively.
Figure 5B:
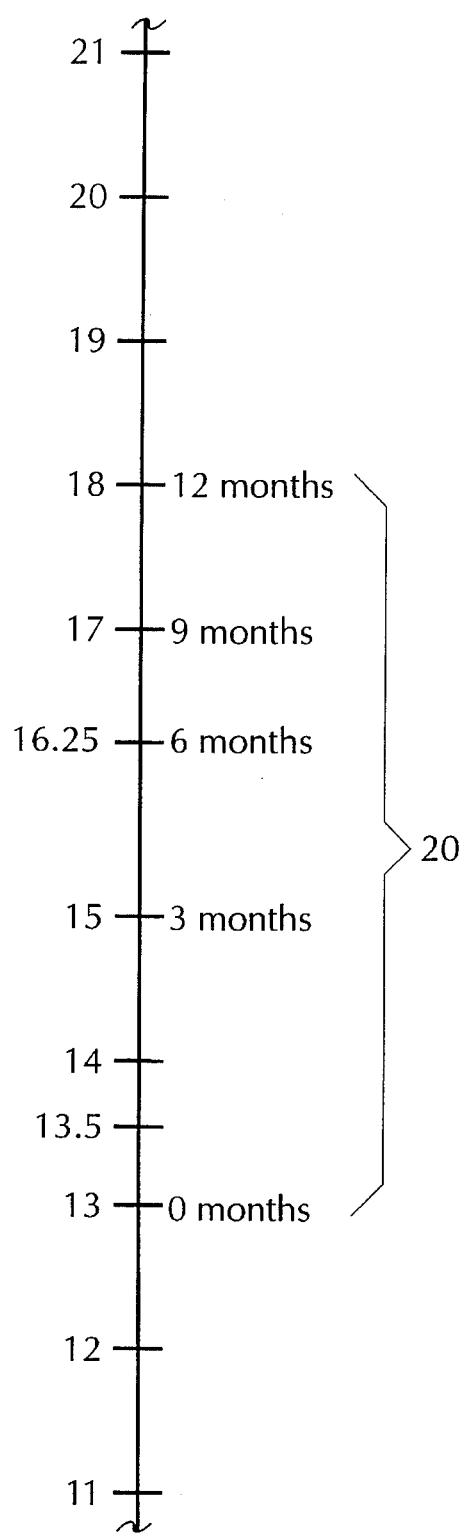

In yet an additional embodiment, distances between demarcations are recognized to differ dependent upon the sex of the child. Accordingly, FIG. 5(A) shows age demarcations 20 that comport with the statistically compiled averages for girls, also showing has marks along the y axis that represent inch lengths proximate to month demarcations 20. Likewise, FIG. 5(B) shows age demarcations 20 that comport with the statistically compiled averages for boys.

It should be understood that the preferred embodiments and examples described are for illustrative purposes only and are not to be construed as limiting the scope of the present invention which is properly delineated only in the appended claims.

I claim:

1. An apparatus for translating the value of a child's age into a set of physical dimensions representing an approximation of the child's anatomical measurements for comparison with an item of apparel, comprising:

(a) an elongated member having a surface;

(b) a first reference-point on said surface and at least one age-based marking on said surface, each said at least one age-based marking indicating a unique age-based value, such that the distance between each said at least one age-based marking and said first reference-point approximates an anatomical dimension of a child having an age equal to that indicated by said at least one age-based marking, and further wherein each of said age-based markings states a different, specific, approximate age in months of a child wherein the distance between said first reference point and a select least one age-based marking can be compared to an item of apparel to determine if the item of apparel will fit a child whose age is approximately equal to the age represented by said select one of said at least one age-based marking.

2. An apparatus according to claim 1, wherein said elongated member is flexible.

3. An apparatus according to claim 2, wherein said elongated member is inside a casing having a slot-type opening for said elongated member to be extracted from said casing.

4. An apparatus according to claim 3, wherein said casing has a mechanism for retracting said elongated member back into said casing.

5. An apparatus according to claim 3, wherein said casing has a locking mechanism to prevent said elongated member from retracting into said casing.

* * * * *